(12) United States Patent
Chuo

(10) Patent No.: US 7,607,514 B2
(45) Date of Patent: Oct. 27, 2009

(54) LINEAR GUIDEWAY WITH A CHANGEABLE OIL-STORAGE UNIT

(75) Inventor: Yung-Tsai Chuo, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 912 days.

(21) Appl. No.: 11/091,829

(22) Filed: Mar. 28, 2005

(65) Prior Publication Data

US 2006/0163005 A1    Jul. 27, 2006

(30) Foreign Application Priority Data

Jan. 13, 2005    (TW) .............................. 94101036 A

(51) Int. Cl.
    *F16N 1/00*    (2006.01)
(52) U.S. Cl. ............................................. 184/5; 403/96
(58) Field of Classification Search ...................... 184/5
     See application file for complete search history.

(56) References Cited

U.S. PATENT DOCUMENTS 5,845,996 A * 12/1998 Greubel et al. ................ 384/45
6,123,457 A *  9/2000 Suzuki et al. ................. 384/13
6,125,968 A * 10/2000 Shirai ............................ 184/5
2003/0164264 A1 *  9/2003 Luo ............................... 184/5
2004/0029740 A1 *  2/2004 Yatsushiro et al. .......... 508/110

* cited by examiner

*Primary Examiner*—Robert A Siconolfi
*Assistant Examiner*—James K Hsiao
(74) *Attorney, Agent, or Firm*—Charles E. Baxley

(57) ABSTRACT

A linear guideway with a changeable oil-storage unit comprises: a rail, a sliding block; an end cap having an oil-filler hole fixed to either end of the sliding block, an oil-storage unit having an oil storage space, a connecting portion, and an oil feeding hole; a joint unit defined with a through hole, and two connecting portions connected to the oil filler hole and the connecting portion of the oil-storage unit, respectively. One of the connecting portions has a plug-in arrangement for providing quick connection to the oil-storage unit, the through hole, the oil filler hole and the oil feeding hole are connected to one other, forming an oil route for providing lubrication for the linear guideway.

5 Claims, 9 Drawing Sheets

LINEAR GUIDEWAY WITH A CHANGEABLE OIL-STORAGE UNIT

BACKGROUND OF THE INVENTION

1. Field of the Invention

The present invention relates to a linear guideway with a changeable oil-storage unit which enables the oil-storage unit to be assembled to or disassembled away from the linear guideway quickly and easily, thus providing a long lasting automatic self-lubrication function for the linear guideway.

2. Description of the Prior Arts

Currently, linear guideway has been widely applied to precision machinery and general mechanism, so self lubricating function of a linear guideway has become more and more important. So far, the self-lubricating methods are generally divided into two types: using an oil-bearing material and smearing the oil of the oil-bearing material to the surface of the rail, or fixing a lubrication unit to the sliding block.

The method of using an oil bearing material, as disclosed in U.S. Pat. No. 6,401,867, U.S. Pat. No. 6,123,457, U.S. Pat. No. 6,257,766, is to fix an oil bearing material to the outer side of the end caps at both sides of the sliding block, the oil is stored in the oil bearing material and then the bearing material keeps contacting the surface of the rail during the movement of the sliding block, thus smearing the oil directly to the surface of the rail, and consequently, the rollers will be lubricated indirectly by the oil on the surface of the rail during rolling motion. Another lubrication method is to fix an oil-storage unit to the outer side of the end caps at both sides of the sliding block, in the oil-storage is stored a small amount of lubricating oil, so that the oil will flow via the end caps to lubricate the rail.

Both of the above-mentioned oil-bearing material and the oil-storage unit only can store a small amount of oil, so the lubrication effect will not last for a long time. However, the service life of the linear guideway is 5-10 years or above, as a result, the rail of the linear guideway will be spoiled ahead of its service life time, due to lack of lubrication. On the other hand it will be time-consuming and difficult when the oil-bearing material and the oil-storage unit are assembled to or disassembled from the sliding block since they are fixed by screwing method.

The present invention has arisen to mitigate and/or obviate the afore-described disadvantages.

SUMMARY OF THE INVENTION

The primary objective of the present invention is to provide a linear guideway with a changeable oil-storage unit which enables the oil-storage unit to be assembled to or disassembled away from the linear guideway quickly and easily, thus providing a long lasting self-lubrication for the linear guideway. The linear guideway includes rail, sliding block, end caps, oil-storage unit and joint unit. The a rail is an elongated structure axially provided at both sides thereof with a rolling passage; the sliding block slideably is mounted on the rail and interiorly provided with a plurality of rollers employed to roll in the rolling passage, so as to enable the sliding block to slide relative to the rail; the end cap is fixed to either end of the sliding block for permitting the rollers to circulate in the sliding block, and on the end cap is defined an oil-filler hole via which the oil flows to the linear guideway, thus the linear guideway can be lubricated automatically.

To provide a long lasting self-lubrication function for the linear guideway, an oil filler hole is formed on the end cap of the sliding block, and then design an oil-storage unit having an oil-storage space and a connecting portion, in the oil-storage space is defined an oil feeding hole. And then a joint unit is made, on which is defined with oil through hole, at both ends of the through hole are defined two connecting portions, one of the connecting portions is connected forward the end cap, and the other of the connecting portions is connected to the connecting portion of the oil-storage unit, so that the through hole of the joint unit, the oil filler hole of the end cap and the oil feeding hole of the oil-storage unit are connected to one other, forming an oil route.

To enable the oil-storage unit to be assembled to or disassembled away from the end cap of the sliding block quickly and easily, one of the connecting portions should have a plug-in arrangement for providing quick connection to the oil-storage unit, so that the oil can flow via the previously mentioned oil route to the end cap, the oil is replenished. Since the oil-storage unit can be easily replaced after the oil is used up, it can provide a long lasting automatic self-lubrication function for the linear guideway, and consequently, the service life of the linear guideway is prolonged.

To vary the production and the application of the oil-storage unit, the oil-storage space of the oil-storage unit can be an integral structure or can be consisted with a base of the oil-storage unit and a cover which are jointed together by ultrasonic welding, thermofussion welding, or gluing methods. The joint unit can be integral with the oil-storage unit or can be integral with the end cap, so that the oil-storage unit can be fixed to the end cap easily.

The present invention also thinks of the connection structure between the oil-storage unit and the joint unit, wherein the connecting portion of the oil-storage unit can a projecting structure employed to insert in a recess structure of the joint unit, or the connecting portion of the oil-storage unit can a recess-shaped structure for engaging with a projecting structure of the joint unit.

For easy replacement of the oil-storage unit, the oil-storage space of the oil-storage unit is made into a close structure in such a manner that an oil feeding hole of the oil-storage unit is sealed with a film or a ball, and the joint unit is provided with a knock pin, when the oil-storage unit is engaged with the joint unit, the knock pin will pierce through the film or push the ball away, so that the through hole of the joint unit is in communication with the oil feeding hole of the oil-storage unit, so as to form an oil route. If the joint unit is integral with the oil-storage unit or the end cap, the film or the ball is sealed at an end of the through hole of the joint unit for prevention of oil leak before connection.

The present invention further thinks of the connection structure between the joint unit and the end cap, the outer diameter of the connecting portion at an end of the joint unit for connecting the oil filler hole of the end cap can be larger than the diameter of the oil filler hole. Or, this connecting portion of the joint unit can be provided with a outer thread and the oil filler hole is provided with a inner thread, so that both can be screwed together. The oil filler hole also can be interiorly provided with locking projection for engaging with the locking groove of the connecting portion of the joint unit.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
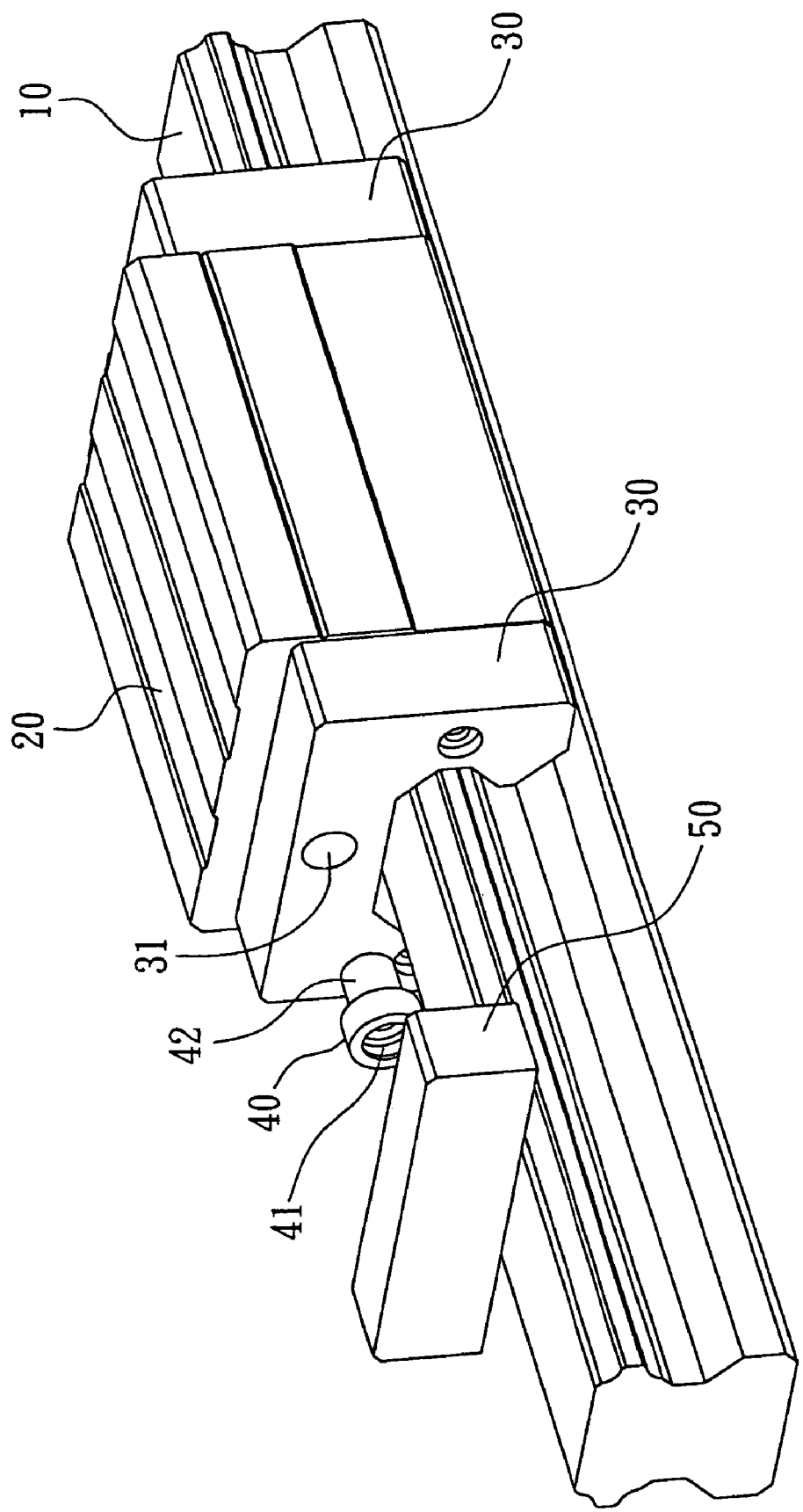
FIG. 1 is a perspective view of a part of a linear guideway in accordance with the present invention.
Figure 2:
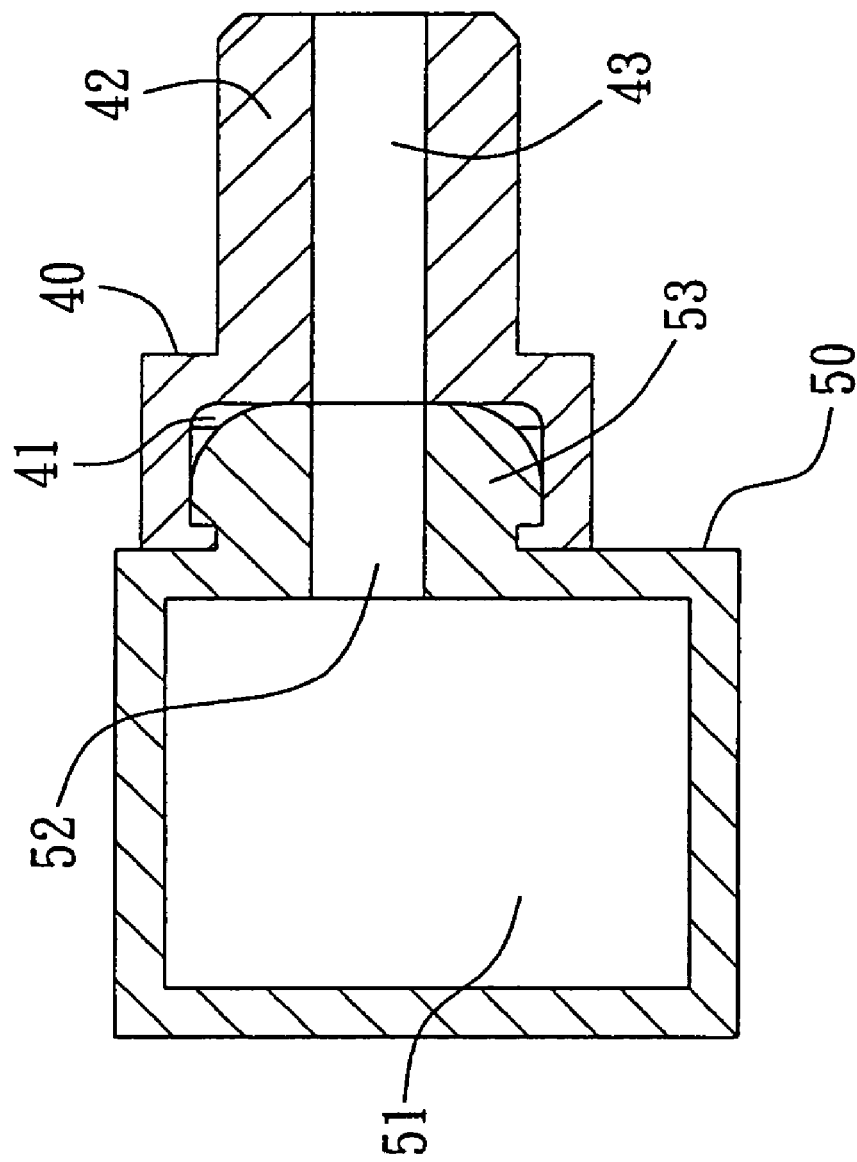
FIG. 2 is a cross sectional view of showing an oil-storage unit being assembled to a joint unit in accordance with the present invention.

FIG. 1 is a perspective view of a part of a linear guideway in accordance with the present invention; FIG. 2 is a cross sectional view of showing an oil-storage unit being assembled to a joint unit in accordance with the present invention. The linear guideway in accordance with the present invention comprises a rail 10, a sliding block 20, two end caps 30, an oil-storage unit 50 and a joint unit 40. The rail 10 is an elongated structure being axially provided at both sides thereof with a rolling passage. The sliding block 20 is slideably mounted on the rail 10 and interiorly contains a plurality of rollers (not shown) employed to roll in the rolling passage, so as to make the sliding block 20 slide relative to the rail 10. To either end of the sliding block 20 is fixed an end cap 30 for permitting the rollers to circulate in the sliding block 20. On the end cap 30 is defined an oil-filler hole 31 which is located either on the end surface or the side surface of the end cap 30, so that oil can flows via the oil-filler hole 31 to the rail. The oil-storage unit 50 is defined with an oil storage space 51, an oil feeding hole 52 and a connecting portion 53. In the joint unit 40 is defined an oil through hole 43, at both ends of the through hole 43 are defined a connecting portion 41 and 42. The connecting portion 42 is connected to the oil filler hole 31 of the end cap 30, and the connecting portion 41 is in the form of a recess engaged with the connecting portion 53 of the oil-storage unit 50, so that the through hole 43 of the joint unit 40, the oil filler hole 31 of the end cap 30 and the oil feeding hole 52 of the oil-storage unit 50 are connected to one other, so as to form an oil route.

Figure 3:
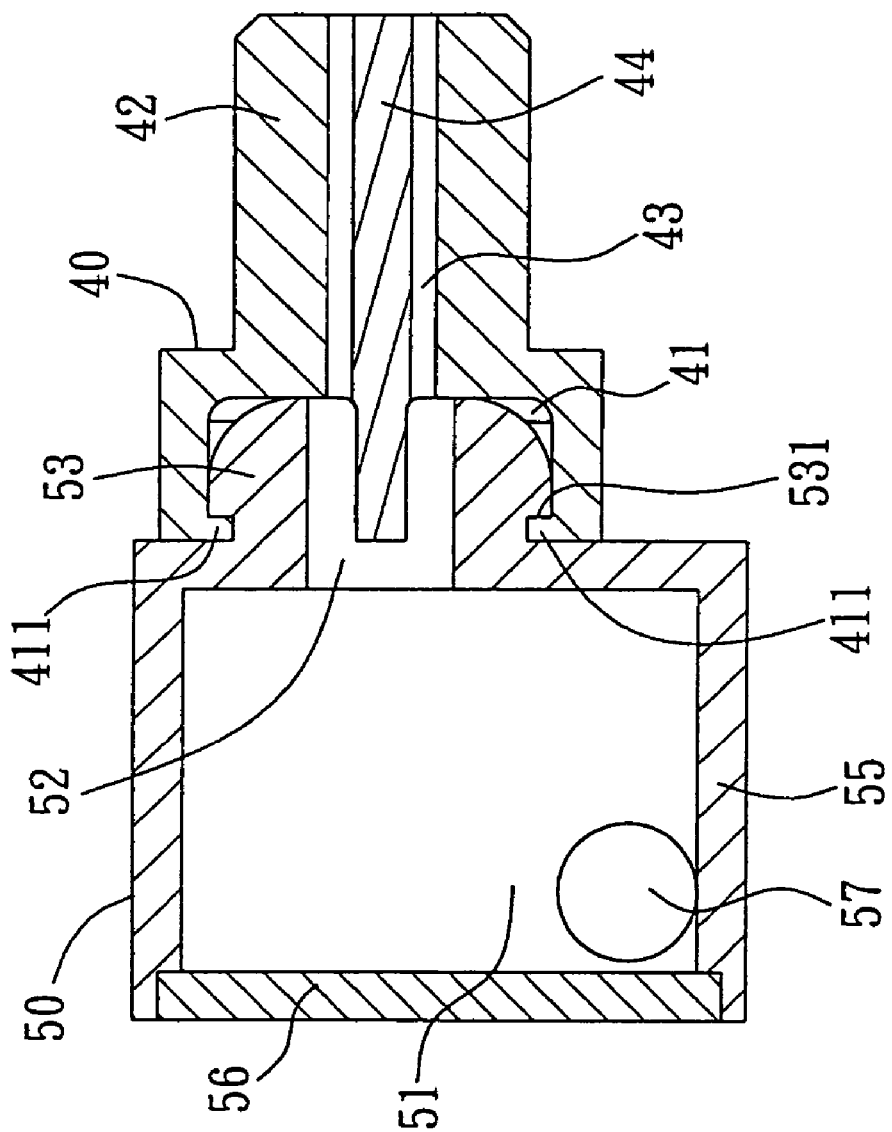
FIG. 3 is a cross sectional view of showing an oil-storage unit being assembled to a joint unit in accordance with a second embodiment of the present invention.
Figure 4A:
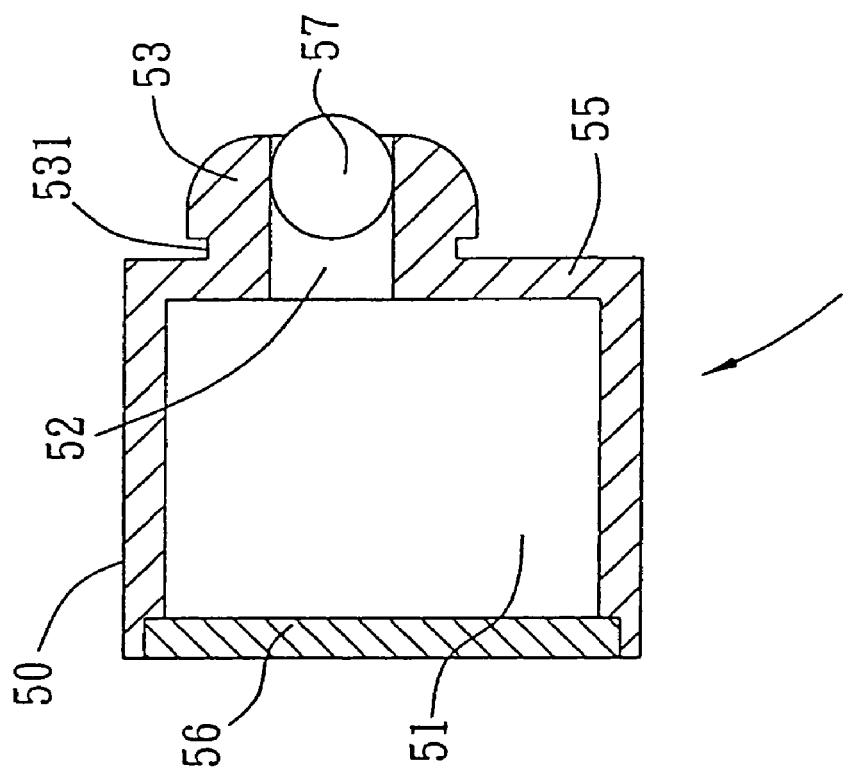
FIG. 4A shows one type of oil-storage unit in accordance with the second embodiment of the present invention.
Figure 4B:
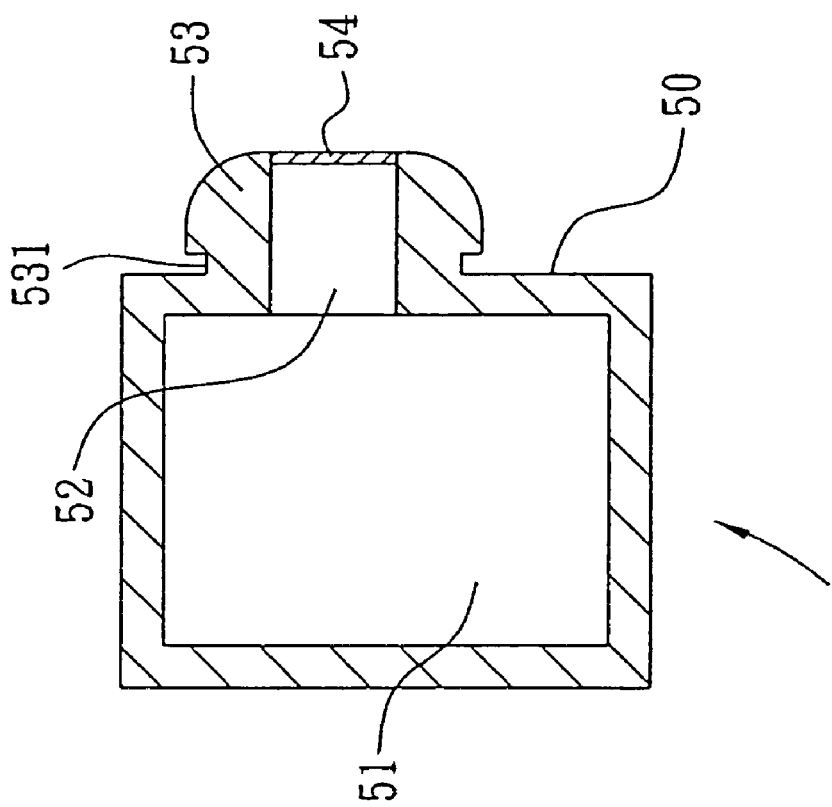
FIG. 4B shows another type of oil-storage unit in accordance with the second embodiment of the present invention.

FIG. 3 is a cross sectional view of showing an oil-storage unit being assembled to a joint unit in accordance with a second embodiment of the present invention. FIGS. 4A-4B show two different types of oil-storage unit in accordance with the second embodiment of the present invention, in which, the oil storage space 51 of the oil-storage unit 50 in FIG. 4A can be an unitary structure, the oil feeding hole 52 of which is sealed with a film 54, so that the oil storage space 51 is a closed space. Furthermore, the connecting portion 53 of the oil-storage unit 50 is provided with locking groove 531. The oil storage space 51 of the oil-storage unit 50 in FIG. 4B is made up of a base 55 and a cover 56, and also is defined with a locking groove 531 on its connecting portion 53, while the oil feeding hole 52 is sealed with a ball 57. The joint unit 40 in this embodiment is provided with a knock pin 44, as shown in FIG. 3, when the connecting portion 53 of the oil-storage unit 50 is engaged with the connecting portion 41 of the joint unit 40, the locking flange 411 on the connecting portion 41 unit 40, will engage in the locking groove 531 of the connecting portion 53, so as to make the oil-storage unit 50 connect to the joint unit 40. At this moment, the knock pin 44 will push the ball 57 away to open the oil feeding hole 52 (or pierce through the film 54 of the FIG. 4A), so that the through hole 43 of the joint unit 40 is in communication with the oil feeding hole 52 of the oil-storage unit 50.

Figure 5A:
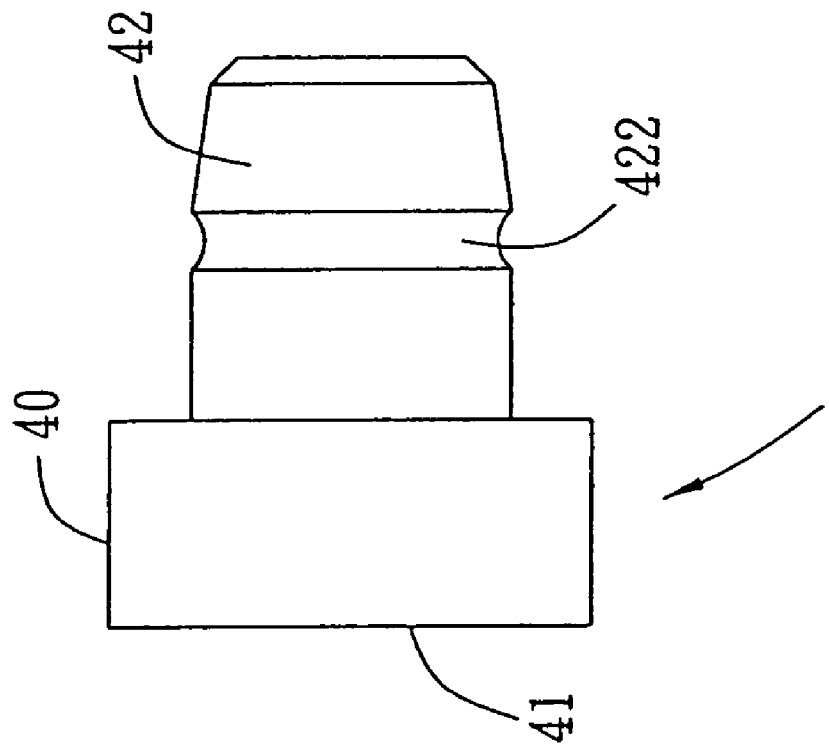
FIG. 5A shows one type of joint unit in accordance with the present invention.
Figure 5B:
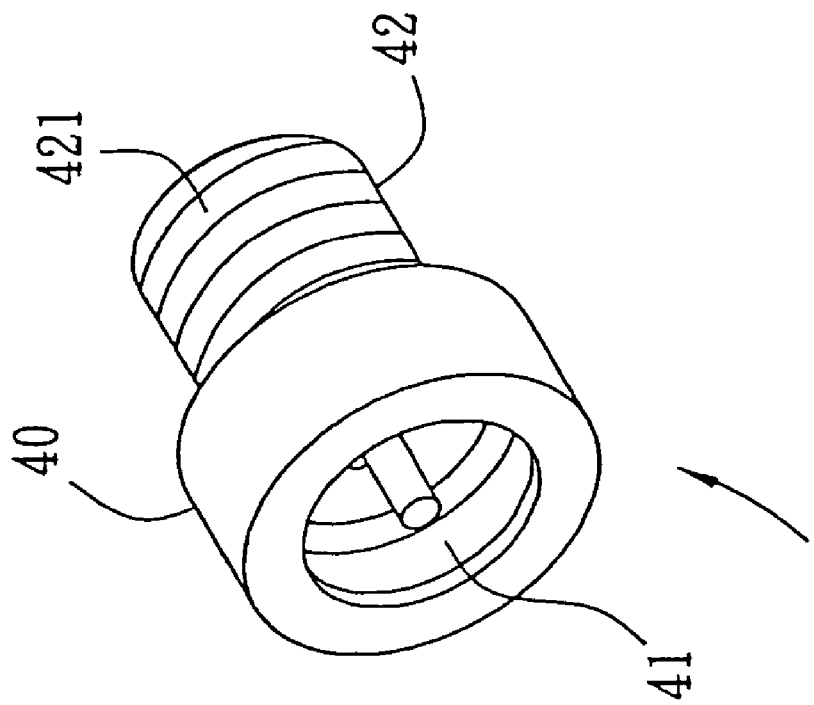
FIG. 5B shows another type of joint unit in accordance with the present invention.
Figure 6:
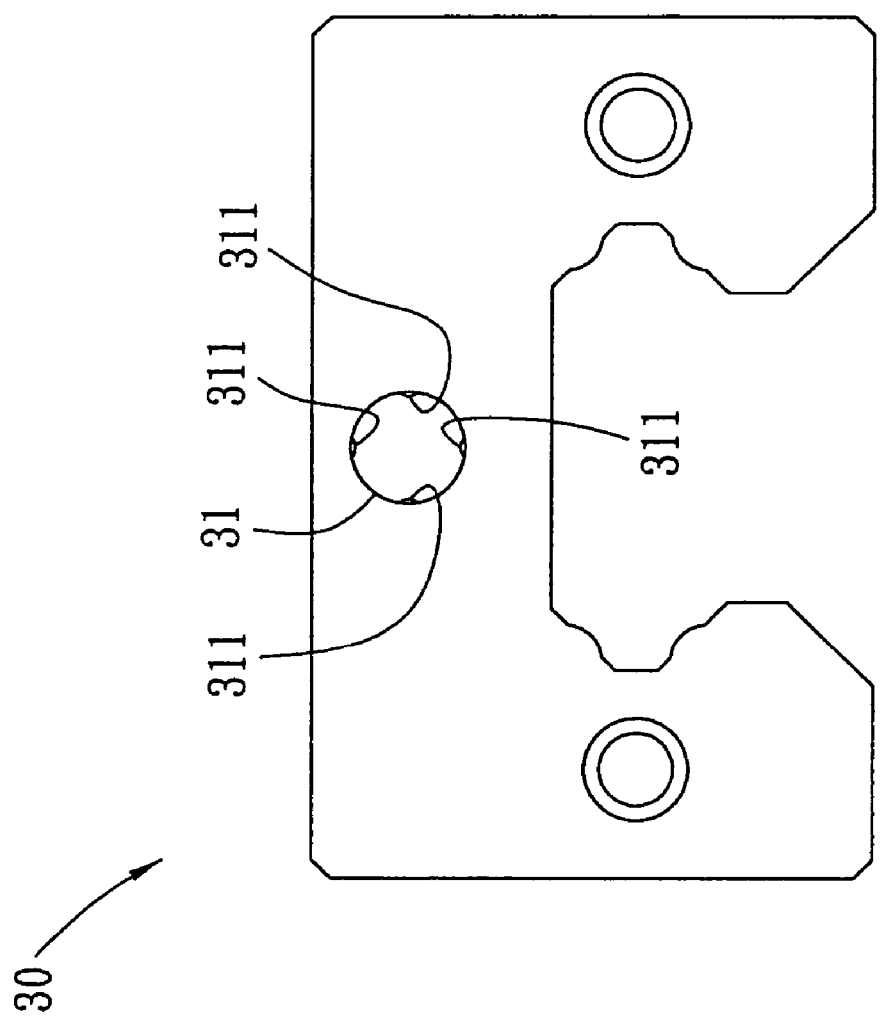
FIG. 6 is an elevational view of an end cup in accordance with the present invention.

FIGS. 5A-5B show different types of joint unit in accordance with the present invention, and FIG. 6 is an elevational view of an end cup in accordance with the present invention, the two figures generally show the connection structure between the joint unit 40 and the end cap 30. The joint unit 40 is also provided with a connecting portion 41 at the end thereof for connecting to the oil-storage unit (not shown), whereas the connecting portion 42 at another end of the joint unit 40 is provided with a outer thread 421 (as shown in FIG. 5A), or is provided with locking groove 422 (as shown in FIG. 5B). On the inner surface of the oil filler hole 31 of the end cap 30 are provided a plurality of locking projections (as shown in FIG. 6) for engaging with the locking groove 422 of the joint unit 40 as shown in FIG. 5B, so as to fix the joint unit 40 to the end cap 30, and to provide a quick connection between the joint unit 40 and the end cap 30.

Figure 7:
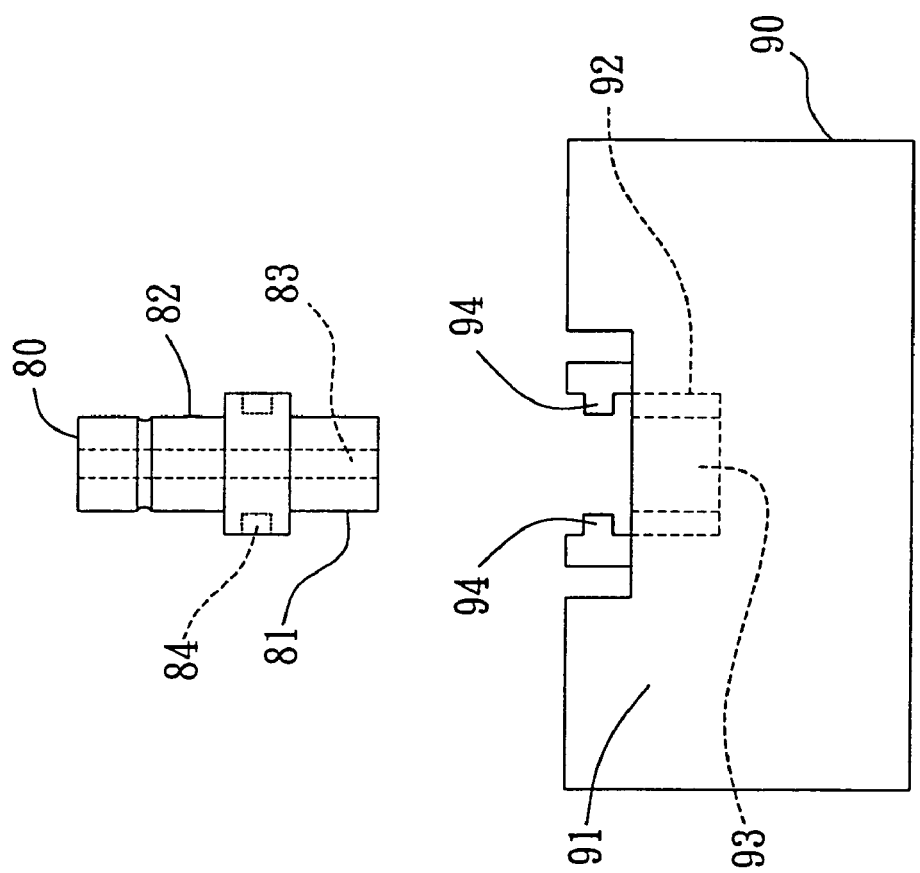
FIG. 7 is a top view of showing an oil-storage unit and a joint unit in accordance with a third embodiment of the present invention.

FIG. 7 is a top view of showing an oil-storage unit and a joint unit in accordance with a third embodiment of the present invention, in which, the oil-storage unit 90 is also provided with an oil-storage space 91, an oil feeding hole 93 and a connecting portion 92. And alike, the joint unit 80 is also defined with a through hole 83, and two connecting portions 81, 82 at both ends of the through hole 83 are used to connect the oil-storage unit 90 and the end cap (not shown). The principle characteristics of this embodiment are that the connecting portion 81 of the joint unit 80 connected to the oil-storage unit 90 is a projecting structure which is used to insert in the recess-shaped structure of the connecting portion 92 of the oil-storage unit 90, besides, the joint unit 80 is provided with a locking groove 84, while the oil-storage unit 90 is formed with an elastic locking projection 94 which is slightly deformable. This structural design also provides a quick connection between the joint unit and the oil-storage unit.

Figure 8:
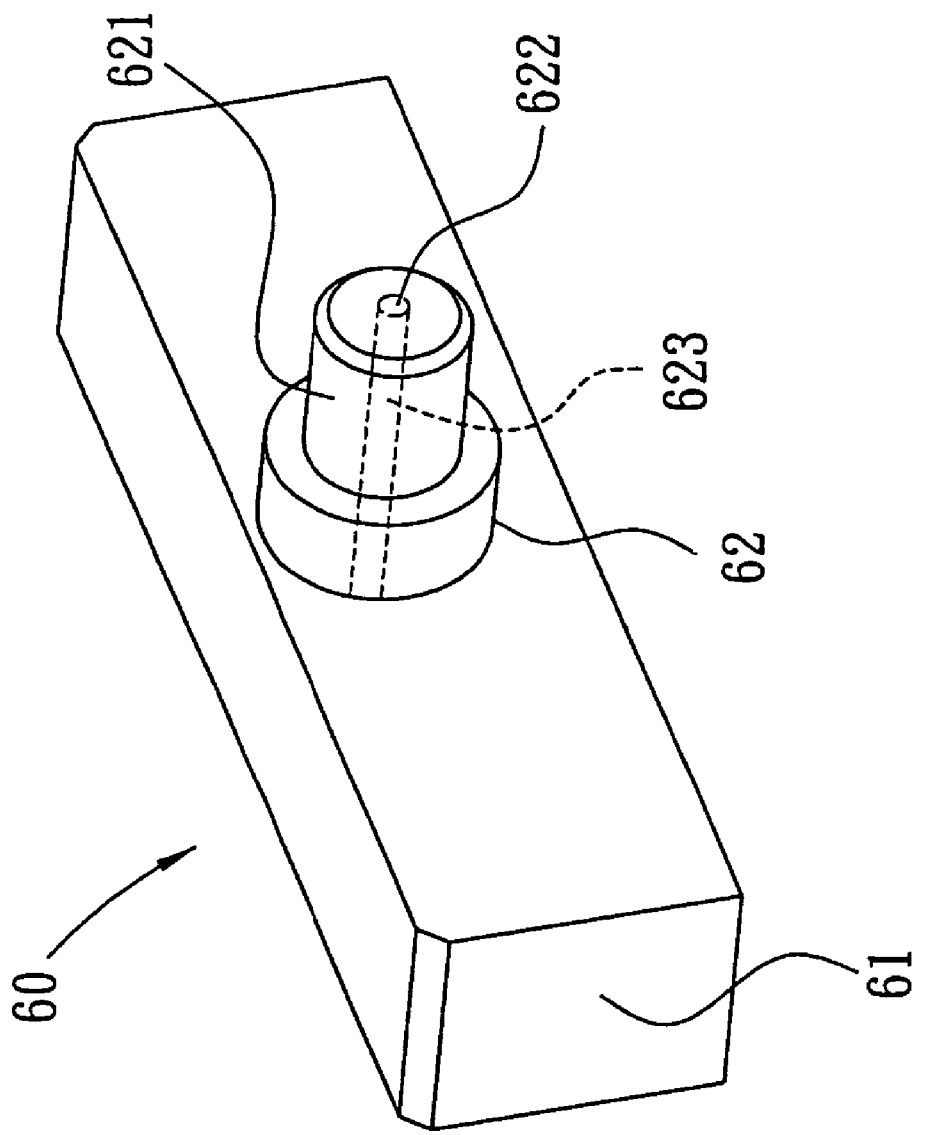
FIG. 8 shows an oil-storage unit being integral with a joint unit.
Figure 9:
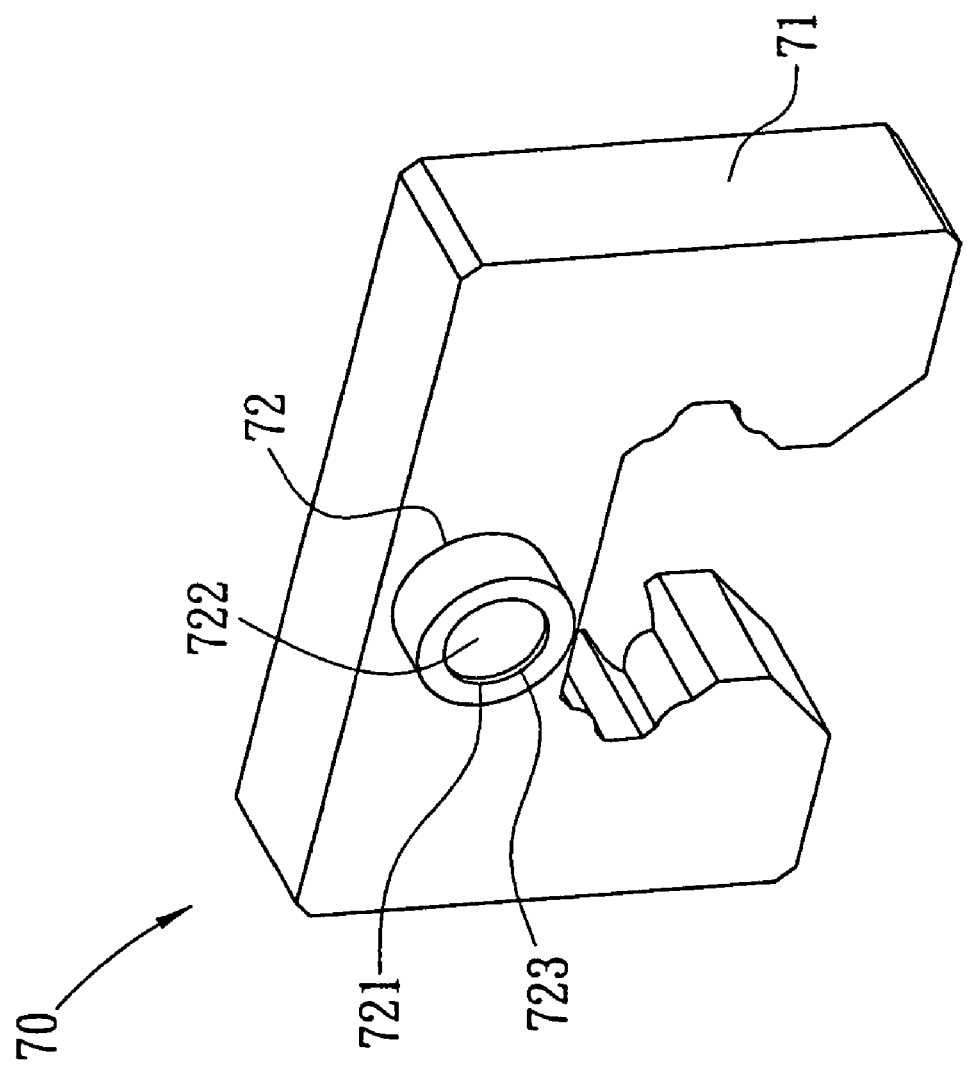
FIG. 9 shows an end cap being integral with a joint unit in accordance with the present invention.

FIG. 8 shows an oil-storage unit being integral with a joint unit, and FIG. 9 shows an end cap being integral with a joint unit in accordance with the present invention. The oil-storage assembly 60 is an integral structure consisted of the oil-storage unit 61 and the joint unit 62, as shown in FIG. 8, the joint unit 62 is also interiorly provided with a through hole 623, and the connecting portion 621 is used to connect the end cap (not shown), an end of the through hole 623 is sealed with a film 622 for prevention of oil leak. The end cap assembly 70 in FIG. 9 is an integral structure comprised of an end cap 71 and a joint unit 72, the joint unit 72 has a connecting portion 721 employed to connect the oil-storage unit (not shown), and an end of the through hole 723 is sealed with a ball 722 for preventing oil leak.

While we have shown and described various embodiments in accordance with the present invention, it should be clear to those skilled in the art that further embodiments may be made without departing from the scope of the present invention.

What is claimed is:

1. A linear guideway with changeable oil-storage unit, comprising:

a rail being an elongated structure axially provided at both sides thereof with a rolling passage;

a sliding block slideably mounted on the rail and interiorly provided with a plurality of rollers employed to roll in the rolling passage, so as to make the sliding block slide relative to the rail;

an end cap fixed to either end of the sliding block for permitting the rollers to circulate in the sliding block;

an oil-storage unit defined with an oil storage space, a connecting portion, and an oil feeding hole arranged in the oil storage space;

a joint unit defined with a through hole, at both ends of the through hole being defined two connecting portions, one of the connecting portions being engaged in an oil filler hole of the end cap in a snap fit manner, and the other of the connecting portions being connected to the connecting portion of the oil-storage unit;

wherein the oil storage unit is mounted onto the end cap by the joint unit in such a manner that the connecting portion of the oil storage unit is engaged with one of the connecting portions of the joint unit in a snap fit manner and then the other one of the connecting portions of the joint unit is engaged in the oil filler hole of the end cap in a snap fit manner, so that once the oil storage unit is assembled onto the end cap by the joint unit, the oil feeding hole of the oil-storage unit connects forward the end cap and forms serves as an oil route for supplying oil from oil storage unit to the end cap.

2. The linear guideway with changeable oil-storage unit as claimed in claim 1, wherein the connecting portion of the oil-storage unit is a projecting structure employed to insert in a recess structure of the joint unit.

3. The linear guideway with changeable oil-storage unit as claimed in claim 1, wherein the connecting portion of the oil-storage unit is a recess-shaped structure for engaging with a projecting structure of the joint unit.

4. The linear guideway with changeable oil-storage unit as claimed in claim 1, wherein the oil feeding hole of the oil-storage unit is sealed with a film, and the joint unit is provided with a knock pin, when the oil-storage unit is engaged with the joint unit, the knock pin will pierce through the film, so that the through hole of the joint unit is in communication with the oil feeding hole of the oil-storage unit, so as to form an oil route.

5. The linear guideway with changeable oil-storage unit as claimed in claim 1, wherein the oil-storage space of the oil-storage unit comprises a base of the oil-storage unit and a cover.

* * * * *